United States Patent [19]
Moore

[11] Patent Number: 5,910,933
[45] Date of Patent: Jun. 8, 1999

[54] STAND ALONE OPTICAL DISC PLAYER MODULE

[75] Inventor: Robert Moore, Sioux City, Iowa

[73] Assignee: Gateway 2000, Inc, North Sioux City, S. Dak.

[21] Appl. No.: 08/846,601

[22] Filed: Apr. 30, 1997

[51] Int. Cl.⁶ .................................................. G11B 17/22
[52] U.S. Cl. ............................................... 369/33; 369/2
[58] Field of Search ................... 369/2, 1, 4, 33, 369/32, 47, 48, 10, 11, 12, 7

[56] References Cited

U.S. PATENT DOCUMENTS

| | | | |
|---|---|---|---|
| 4,811,314 | 3/1989 | Alves | 369/10 |
| 5,122,721 | 6/1992 | Okada et al. | 320/2 |
| 5,122,999 | 6/1992 | Kimura et al. | 369/32 |
| 5,210,727 | 5/1993 | Shimizume et al. | 369/32 |
| 5,214,514 | 5/1993 | Haberkern | 358/335 |
| 5,235,586 | 8/1993 | Feamster et al. | 369/100 |
| 5,329,503 | 7/1994 | Ohmori et al. | 369/13 |
| 5,349,575 | 9/1994 | Park | 369/1 |
| 5,365,502 | 11/1994 | Misono | 369/18 |
| 5,396,340 | 3/1995 | Ishii et al. | 358/342 |
| 5,449,221 | 9/1995 | Stander | 297/423.4 |
| 5,467,329 | 11/1995 | Hashimoto | 369/48 |
| 5,566,290 | 10/1996 | Silverbrook | 395/152 |
| 5,644,505 | 7/1997 | Soutar et al. | 364/514 B |

*Primary Examiner*—Tan Dinh
*Attorney, Agent, or Firm*—Schwegman, Lundberg, Woessner & Kluth P.A.; Anthony Claiborne

[57] ABSTRACT

An optical disc player for a computer is disclosed. The player is operable in a CD-ROM mode in which the player is inserted into a computer, as well as a stand-alone mode in which the player plays audio compact discs while removed from the computer. The player in one embodiment comprises a housing, an optical disc mechanism, a power source component, and one or more audio controls. The power source component provides power to the optical disc mechanism when the player is operating in the stand-alone mode. Each audio control corresponds to an audio function for when an audio compact disc is being played in the player.

10 Claims, 5 Drawing Sheets

FIG. 6

STAND ALONE OPTICAL DISC PLAYER MODULE

FIELD OF THE INVENTION

This invention relates generally to a modular optical disc player for a computer, and more specifically to such a player that plays audio compact discs in a stand-alone mode.

BACKGROUND OF THE INVENTION

In recent years computers have come equipped with internal peripherals which previously had been added to the computers as add-on external devices. Such peripherals include the compact-disc read-only-memory (CD-ROM) player, which is one type of optical disc player and which permits a user of the computer to play CD-ROM discs, and frequently audio compact discs, while using the computer. Where once CD-ROM players were exclusively an external device coupled to a computer via a serial or other cable, today CD-ROM players are typically included as internal peripherals that come with the computer.

A disadvantage to the inclusion of peripherals such as CD-ROM players as internal devices to a computer is that there is limited space within a computer to house such devices. This is especially true in the case of laptop computers. A laptop computer user may wish to have at different times a floppy disk drive, one or more batteries, a CD-ROM player, as well as other peripherals, connected to the computer. Because the purpose underlying laptop computers is portable computing, having even one of these peripheral attached as an external device largely defeats this purpose. However, having a laptop computer with all such peripherals installed as internal devices at one time also defeats this purpose by making the computer too heavy and too large, assuming that the devices even can all be installed internally at the same time in the first place.

One solution has been to make the internal devices modular, so that they are removable from the computer. This solution works with desktop as well as laptop computers. Because a computer user typically only needs at any given time one or two of the large number of available peripherals, the user neatly slides only the peripherals currently needed into the computer. In the case of a laptop computer, this permits the computer to remain portable, but at the same time also remain flexible in the number of peripherals that can be used with the computer.

A disadvantage to this solution, however, is that the modular peripherals are typically not useful when removed from the computer. While a battery removed from such a computer may have a good use in that it can be charged for later insertion into the computer, other peripherals are not so useful when removed from the computer. This is especially the case with modular CD-ROM players.

Modular CD-ROM players for computers are flexible peripherals in that they frequently permit the playing of audio compact discs in addition to CD-ROM discs when inserted into a computer. However, if the player is removed from the computer, it is no longer able to play audio compact discs. Because of this, the computer user is forced to also carry a portable audio compact disc player to ensure that audio discs can always be played. Always bringing along a portable audio compact disc player, however, renders the audio capability of the CD-ROM player unnecessarily duplicative.

There is a need, therefore, for a modular CD-ROM player that can play audio compact discs when the player is removed from the computer. Such a modular CD-ROM player that is operable in a stand-alone audio mode would render unnecessary the need for the user to also carry a portable audio compact disc player. That is, there is a need for a modular CD-ROM player that ensures uninterrupted play of audio compact discs regardless of whether the player is inserted into or removed from a computer.

SUMMARY OF THE INVENTION

This invention provides for an optical disc player that can also play audio compact discs in a stand-alone mode. In a first embodiment of the invention, an optical disc player has a housing, an optical disc mechanism, a power source component, and one or more audio controls. The housing is removably insertable into the computer. The mechanism is disposed within the housing and is capable of playing audio compact discs. The power source component is also disposed within the housing, and provides power to the mechanism in a stand-alone mode. The stand-alone mode permits the playing of an audio compact disc when the player is removed from the computer. Each of the audio controls is supported by the housing and corresponds to an audio function.

In this manner, the invention provides for the playing of audio compact discs in a stand-alone mode. An optical disc player in accordance with one embodiment of the invention includes a power source component to power the mechanism when the player is removed from the computer, as well as one or more audio controls for controlling the playing of audio compact discs when the player is removed from the computer. The power source component is necessary in this embodiment because it supplies power to the player that is otherwise supplied by the computer when the player is inserted therein. Further, the audio controls are necessary in this embodiment because they provide for control of the audio finctionality of the player that is also otherwise provided by the computer when the player is inserted therein.

Other embodiments of the present invention include a computer having a disc player removably insertable into the computer and operable in the already described stand-alone mode, as well as a system comprising such a computer and a disc player and also a remote control to control the audio fumctionality of the player. Still other and further aspects, advantages, and embodiments of the present invention will become apparent in the following description and by reference to the accompanying drawings.

DETAILED DESCRIPTION OF THE INVENTION

Figure 1:
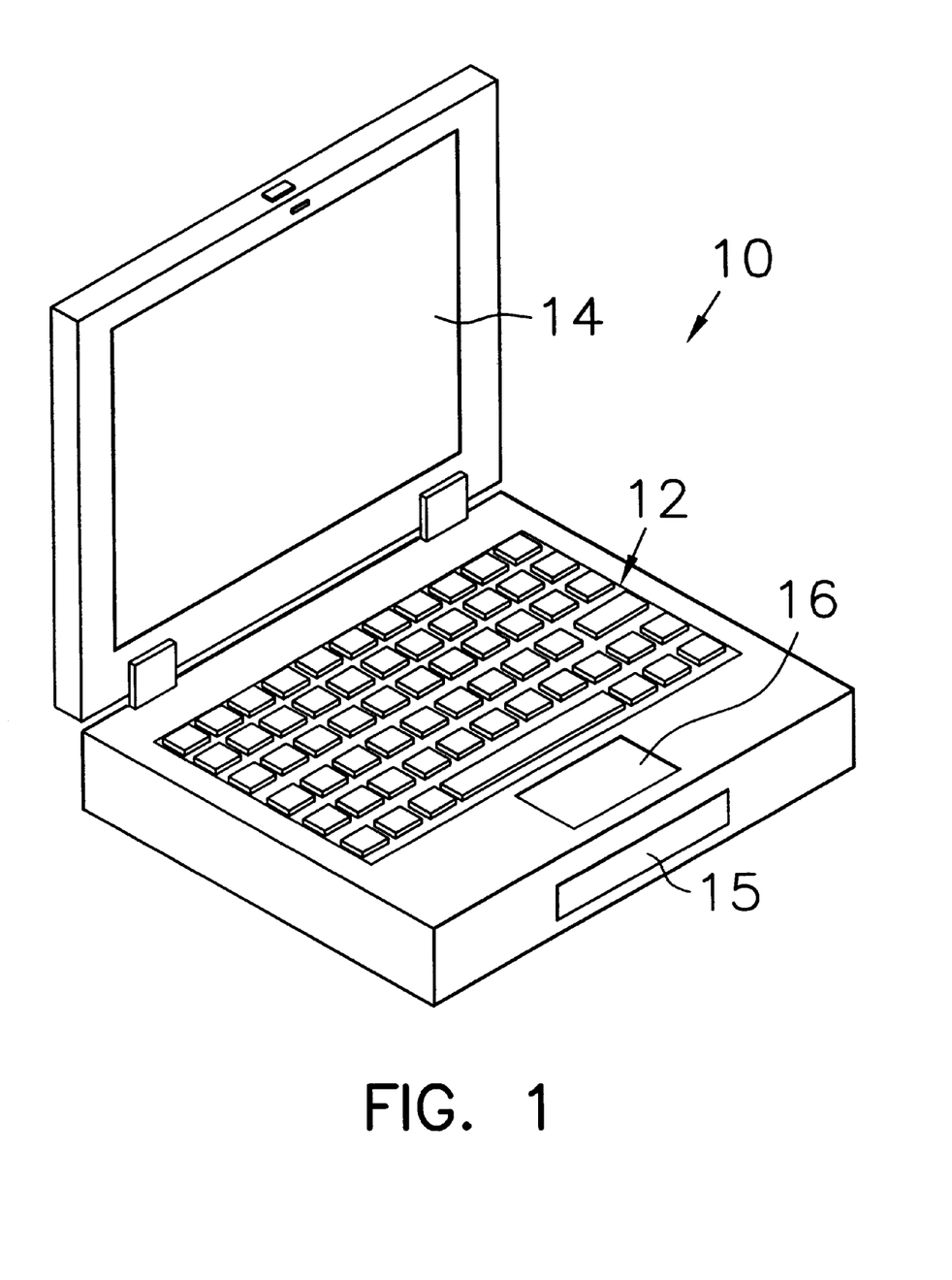
FIG. 1 is a diagram of a typical computer in conjunction with which the present invention may be implemented.

This invention provides for an optical disc player that can play both CD-ROM's and audio compact discs in conjunction with the computer, as well as audio compact discs in a stand-alone mode. A diagram of a typical computer in conjunction with which the present invention may be implemented is shown in FIG. 1. Computer 10 typically includes keyboard 12, display device 14 and pointing device 16. Not shown is that computer 10 also typically comprises a random-access memory (RAM), a central-processing unit (CPU, and one or more storage devices, such as a hard disk drive, a floppy disk drive, a CD-ROM drive, or a tape cartridge drive, although the invention is not so limited. As shown, computer 10 is a laptop computer, such as a Gateway 2000 Solo laptop computer, although the invention is not so limited. For example, computer 10 could also be a desktop computer such as a Gateway 2000 desktop computer.

As shown in FIG. 1, display device 14 is a flat-panel display device such as a liquid crystal display (LCD). However, the invention is not so limited; display device 14 can be any of a number of different devices. Pointing device 16 as shown in FIG. 1 is a touch pad, although the invention is also not so limited. For example, pointing device may also be a mouse, or a-trackball, without departing from the spirit or scope of the present invention. The front edge of CD-ROM player 15 is shown in FIG. 1. CD-ROM player 15 fits into a corresponding slot of computer 10.

Figure 2:
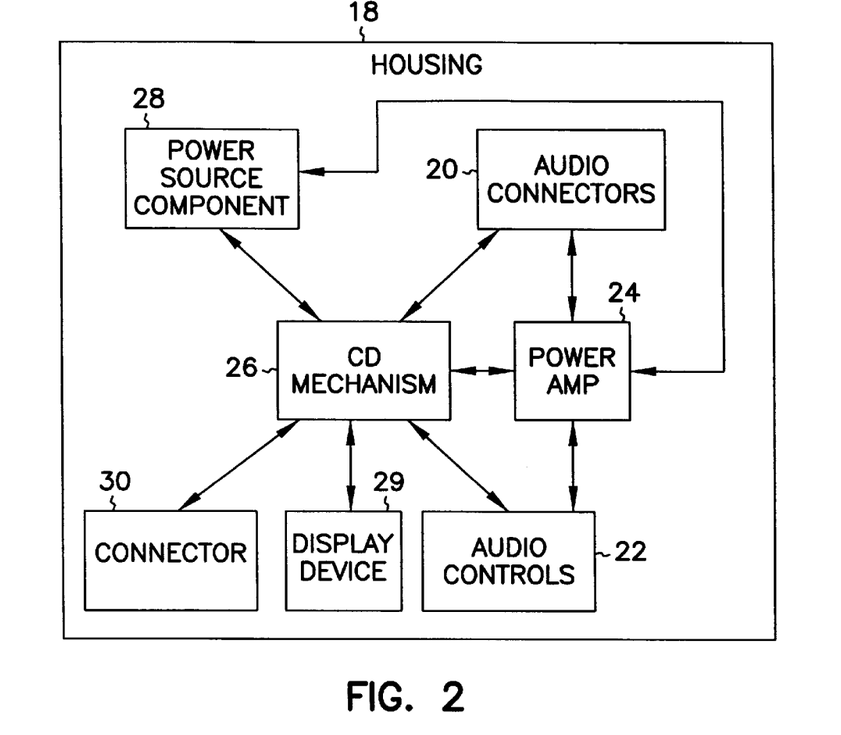
FIG. 2 is a block diagram illustrating an embodiment of the present invention.

Referring now to FIG. 2, a block diagram illustrating a CD-ROM player in accordance with one embodiment of the present invention is shown. The CD-ROM player of FIG. 2 is one type of optical disc player; the invention is not so limited. The CD-ROM player comprises housing 18, which houses audio connectors 20, audio controls 22, power amplifier 24, compact disc mechanism 26, power source component 28, and connector 30. Those of ordinary skill within the art will appreciate that the present invention is not limited to a CD-ROM player having each of the components as is shown in FIG. 2. Rather, the invention is limited only as set forth in the claims that follow.

Housing 18 encases each of audio connectors 20, audio controls 22, power amplifier 24, compact disc mechanism 26, power source component 28, display device 29 and connector 30. Housing 18 fits into a corresponding slot within the computer in which the CD-ROM player is meant to be inserted. As those skilled in the art will appreciate, housing 18 is therefore typically a rectangular shell, and is manufactured from a material resistant to breaking and is sturdy. Examples of such materials include Bayer/Miles Bayblend FR110-2679 PC/ABS, General Electric C2800 PC/ABS, Starex VH-0810 ABS, Starex VE-0812 PC/ABS, Geon M-3750 PVC, General Electric SEA2 CYCOLAC, Nippon Steel Chemical Estyrene CS0, and Minwon HFA-700. However, the invention is not so limited. That is, housing 18 can be made from any such material without departing from the spirit and scope of the present invention. Furthermore, in one embodiment housing 18 is shaped for insertion into a corresponding slot of a laptop computer, while in another embodiment it is shaped for insertion into a corresponding slot of a desktop computer.

Audio connectors 20 are supported by housing 18 such that they remain in place, but permit coupling of audio devices to the CD-ROM player. Audio connectors 20 couple to compact disc mechanism 26, as well as power amplifier 24. When operating in a stand-alone mode, the CD-ROM player produces audio signals from an audio compact disk inserted therein at audio connectors 20. Therefore, audio connectors 20 permits the coupling of audio devices so that those audio devices can record, make audible, etc., the audio signals. In one embodiment of the invention, audio connectors 20 includes a ⅛" headphone jack to permit commonly available headphones to couple to the CD-ROM player. The headphones, as those of ordinary skill in the art will appreciate, permit a user of the CD-ROM player device to hear the audio signals produced from the audio compact disc. Other audio connectors 20 may include a pair of RCA jacks, for separating the stereo audio signal into its individual left and right components, and a digital line out (such as that known as SP DIF) for connection to higher quality digital to analog converters. The invention, however, is not limited to any particular audio connector or audio connectors. Audio connectors 20 can include any audio connector or audio connectors without departing from the scope or spirit of the present invention.

Audio controls 22 are also supported by housing 18, such that they remain in place but permit access by a user of the CD-ROM player to activate any of the controls.

Audio controls 22 couples to compact disc mechanism 26. Audio controls 22 each typically include a button or other control mechanism tied to a particular audio function or functions, either alone or in conjunction with other of the audio controls. Audio controls 22 are active during operation in a stand-alone mode, and in one embodiment also are active during operation in a docking mode (in the case where controls 22 are accessible when the player is docked within the computer). In one embodiment, audio controls 22 includes controls for play, fast forward, fast back, skip to next track, skip to previous track, stop and eject. Audio controls 22 also includes an on/off button. One embodiment of the invention also includes controls for controlling the volume that is output to at least one of audio connectors 20, the volume control typically being a dial (analog) control. The invention, however, is not limited to any particular audio control or controls. Audio controls 20 can include any audio control or controls without departing from the scope or spirit of the present invention.

Power amplifier 24 is encased within housing 18. Power amplifier 24 amplifies the audio signals produced from an audio compact disc inserted into the CD-ROM player in a stand-alone mode, and is coupled to at least one of audio connectors 20 to output the amplified audio signals at that output. Power amplifier 24 is also coupled to power source component 28, from which it receives power to amplify the signals. Power amplifier 24 receives the audio signals from compact disc mechanism 26. The present invention is not limited to any particular power amplifier 24. However, in one embodiment, power amplifier 24 amplifies the signal by a maximum of ten watts. Power amplifier 24 can be any type of power amplifier, producing any level of power, without departing from the spirit or scope of the present invention. Note that power amplifier 24 in one embodiment is also coupled to the volume control of audio connectors 20, so that the level of amplification of the audio signals by power amplifier 24 is variable and controllable by the user of the CD-ROM player.

Compact disc mechanism 26 is also encased within housing 18, and is coupled to audio connectors 20, audio controls 22, power source 28, display device 29 and connector 30. Compact disc mechanism 26 is one type of optical disc mechanism; the invention is not so limited. Compact disc mechanism 26 accepts audio compact discs and CD-ROM discs. The CD-ROM discs are playable in a CD-ROM mode; that is, in a mode in which the CD-ROM player is inserted into the computer. The audio compact discs are playable in a stand-alone mode; that is, in a mode in which the CD-ROM player is removed from the computer. In one embodiment, the audio compact discs are also playable in the CD-ROM mode. Mechanism 26 includes a drawer that slides out from housing 18 to accept a compact disc from a user, or in another embodiment an opening into which a user inserts a CD-ROM. Mechanism 26 also includes a servomotor to spin the disc, and a spindle to keep the disc fixed in place while it spins. Furthermore, mechanism 26 includes a laser optical reading head to read the audio or CD-ROM information stored on the disk, and translate the information to analog audio or digital data signals. The invention is not limited to any particular type of compact disc mechanism 26. Examples of compact disc mechanisms commonly available include the Teac CD-40E-900, the Matsushita UJDCD4720, and the Toshiba XM-1302B. Mechanism 26 can be of any type without departing from the spirit or scope of the invention.

Power source component 28 is also disposed within housing 18, and is coupled to compact disc mechanism 26 in order to provide power to mechanism 26 when the CD-ROM player is removed from a computer. That is, power source component 28 supplies power to compact disc mechanism 26 when the CD-ROM player is operating in the stand-alone mode. Power source component 28 is also coupled to amplifier 24 to provide amplifier 24 power for amplification. In one embodiment, power source component 28 includes a direct current power connector for attachment to alternating current adapter. In another embodiment, component 28 comprises a compartment for one or more removable batteries. The batteries may be non-rechargeable, such as alkaline batteries commonly available in AA and AAA sizes, or rechargeable, such as ni-cad, nickel metal hydride, or lithium ion batteries. The rechargeable batteries recharge while the optical disc player is in the computer via a recharging circuit which is also a part of component 28 or in the computer 10. As those of ordinary skill within the art will appreciate, power source component 28 can comprise any type of power source without departing from the spirit or scope of the invention.

Display device 29 is also disposed within housing 18. Display device 29 displays status information regarding the playing of the CD-ROM or CD within mechanism 26, to which device 29 is coupled. This status information includes the current track number, as well as the time left to be played on that particular track. In one embodiment, device 29 is a liquid crystal display, although the invention is not so limited.

Connector 30 is also disposed within housing 18, and is coupled to compact disc mechanism 26 in order to provide for communication between the computer and the CD-ROM player when it is operating in CD-ROM mode, as well as provide power to the CD-ROM player in CD-ROM mode. The present invention is not limited to any particular type of connector 30. However, in one embodiment of the invention, connector 30 is a connector of type Kel connector 8901-080-177LX, as is commonly used to interface modular peripheral devices to their computer hosts. Any type of connector 30, however, can be used without departing from the spirit or scope of the invention.

As has been described and shown in conjunction with FIG. 2, a modular CD-ROM player in accordance with an embodiment of the invention operates as follows. If housing 18 of the player is inserted into a computer, the user may insert and remove CD-ROM discs, and in one embodiment, audio discs, into compact disc mechanism 26. All control of the compact disc mechanism in this CD-ROM mode is accomplished by computer, as the computer communicates with mechanism 26 via connector 30. Alternatively, control of the compact disc mechanism is accomplished by controls residing on the optical disc player itself, which are still accessible when the player is docked in the computer. Furthermore, mechanism 26 receives power via connector 30 as well.

When housing 18 of the player is removed from the computer, however, the user may still insert and remove audio compact discs for playing into compact disc mechanism 26. In this stand-alone mode, mechanism 26 receives its power from power source component 28. The user of the player selects which audio functions are to be performed on the audio disc inserted into mechanism 26 via audio controls 22. Furthermore, the user is able to plug headphones or other audio devices to audio connectors 20, to listen to the audio signals, record them, etc. Power amplifier 24 amplifies the signal to at least one of audio connectors 20, and the user is able to increase or decrease the volume by one of audio connectors 20 so specified.

As has been described and shown in conjunction with FIG. 2, then, the present invention provides for a number of advantages. By allowing a user of the player to use the CD-ROM player apart from the computer in which it can be inserted, the present invention provides for a dual-flinctioning CD-ROM player. When the player is inserted into the computer, it can read CD-ROM discs, and in one particular embodiment, can also play audio discs. However, when removed from the computer, the CD-ROM player can be used like a stand-alone audio compact disc player. Therefore, the present invention permits a computer user to not have to carry a separate stand-alone audio compact disc player for those situations in which the CD-ROM player is removed from the computer.

Figure 3:
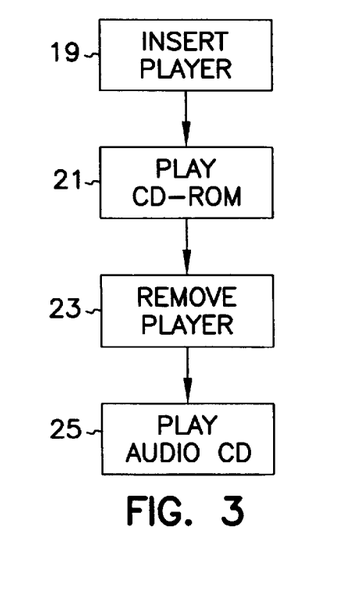
FIG. 3 is a flow chart illustrating a method in accordance with the present invention.

Referring now to FIG. 3, a flow chart illustrating a method in accordance with the present invention is shown. In step 19, a CD-ROM player (for example, the CD-ROM player shown in FIG. 2) is inserted into a computer. In step 21, the CD-ROM player reads data from a CD-ROM compact disc, or writes data to such a disc, in a CD-ROM mode. The CD-ROM player is controlled by the user through the computer (i.e., pressing keys on the keyboard coupled to the computer, running a program that controls the player, etc.), and is also powered by the computer. In step 23, the CD-ROM player is removed from the computer. Finally, in step 25, the CD-ROM player plays an audio compact disc in a stand-alone mode. That is, the CD-ROM player operates completely independently and separate from the computer. The CD-ROM player includes a separate power source component to provide it power, and one or more audio controls so that the user can control the audio functions of the player as applied to the audio disc contained therein.

Figure 4:
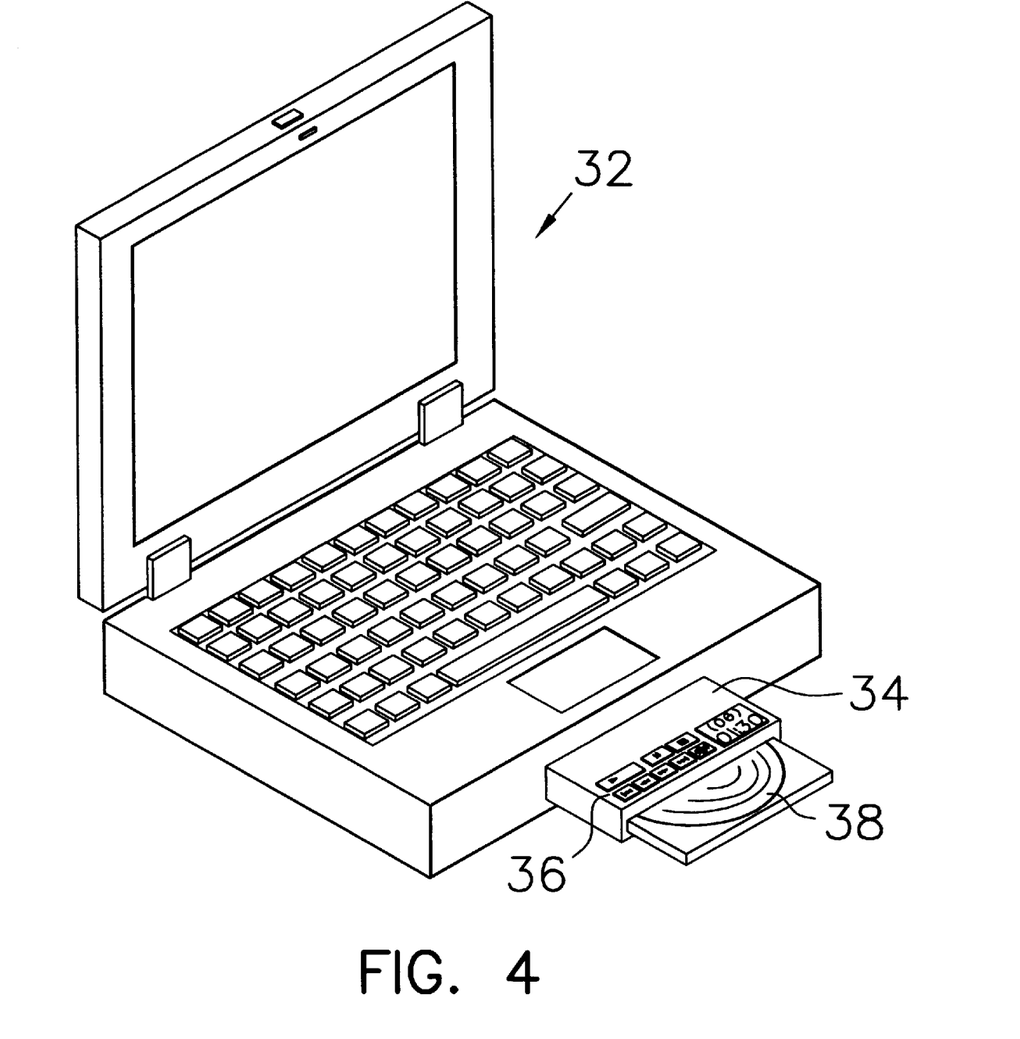
FIG. 4 is an exploding perspective view of one embodiment of the present invention.

An exploding perspective view of one particular embodiment of the present invention is shown in FIG. 4. Referring now to FIG. 4, laptop computer 32 has partially inserted therein CD-ROM player 34. CD-ROM player 34 includes audio controls 36 and disc tray 38 as shown. Laptop computer 32 corresponds to laptop computer 10 of FIG. 1, and reference should be made to the discussion in conjunction with computer 10 for farther understanding thereto. CD-ROM player 34 is shown partially inserted into computer 32 to show how player 34 is removably inserted into computer 32. Specifically, player 34 is pushed by a user of computer 32 into a corresponding slot of computer 32 for operation in the CD-ROM mode, or alternatively is pulled from the slot for operation in a stand-alone mode.

Audio controls 36 of player 34 permits a user of player 34 to control the audio functionality and the playing of audio discs in the stand-alone mode. Audio controls 36 correspond to audio controls 22 of FIG. 2, and reference should be made to the discussion in conjunction with controls 22 for further understanding thereto. Disc tray 38 is part of the compact disc mechanism of player 34. The compact disc mechanism of player 34 corresponds to compact disc mechanism 26 of FIG. 2, and reference should be made to the discussion in conjunction with mechanism 26 for further understanding thereto.

Figure 5:
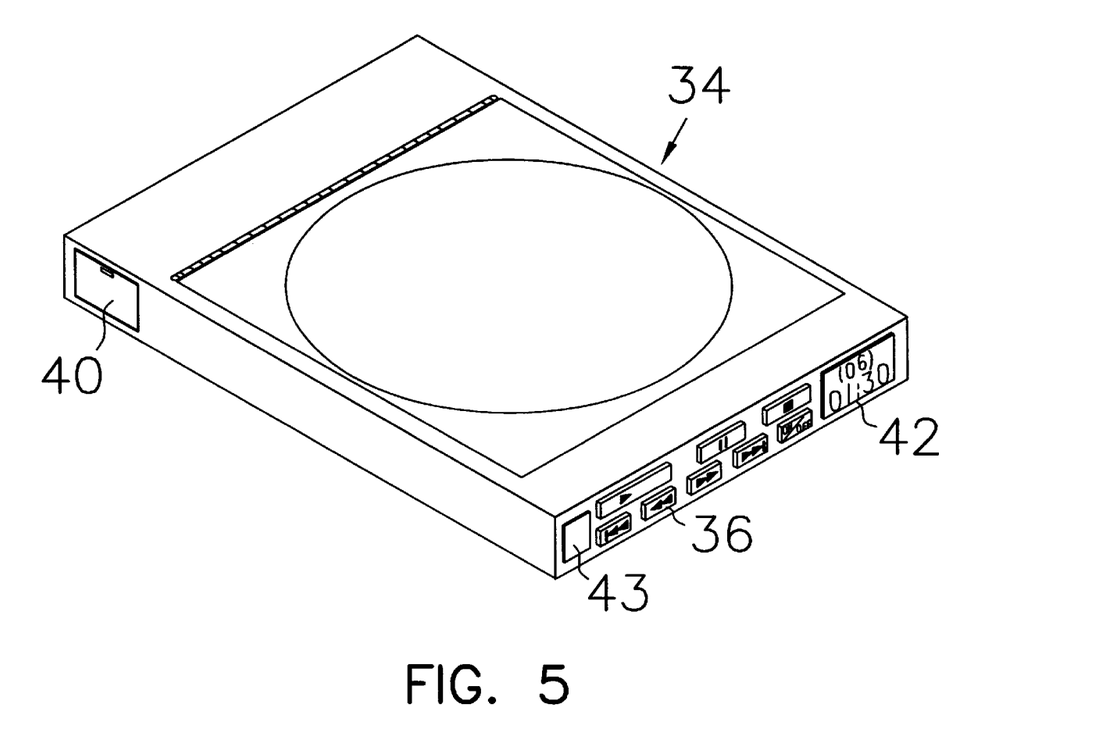
FIG. 5 is a perspective view of a stand-alone CD player of another embodiment of the invention; and, FIG. 6 is a perspective view of a remote control for a CD-ROM player in accordance with an embodiment of the invention.

As shown in FIG. 4, player 34 has its controls 36 residing on the top of player 34. This means that the controls are not accessible when player 34 is inserted into laptop 32. However, in another embodiment, player 34 includes controls 36 that reside on the front of player 34, so that they are accessible when player 34 is inserted into laptop 32. This is shown in FIG. 5, which is a perspective view of a CD-ROM player according to an embodiment of the invention having front-located controls. Referring now to FIG. 5, player 34 includes audio controls 36 mounted on the front surface of player 34, as well as display device 42 (as shown, a liquid crystal display), and release button 43. Display device 42 corresponds to display device 29 of FIG. 2. Release button 43 permits manual release of player 34 by applying force thereto. Door 40 is located on a side surface of player 34. Behind door 40 a storage compartment is located for the insertion of batteries for the powering of player 34.

As has been shown and described in conjunction with FIG. 4 and FIG. 5, the present invention is operable in a stand-alone mode independent of a computer by removing player 34 from computer 32. The user inserts an audio compact disc into tray 38, which is part of the compact disc mechanism for player 34. The user controls the audio functionality for that disc via controls 36. The batteries stored in the compartment behind door 40 provide power for the disc to be played, and the status of the disc's playing is shown in display 42.

Figure 6:
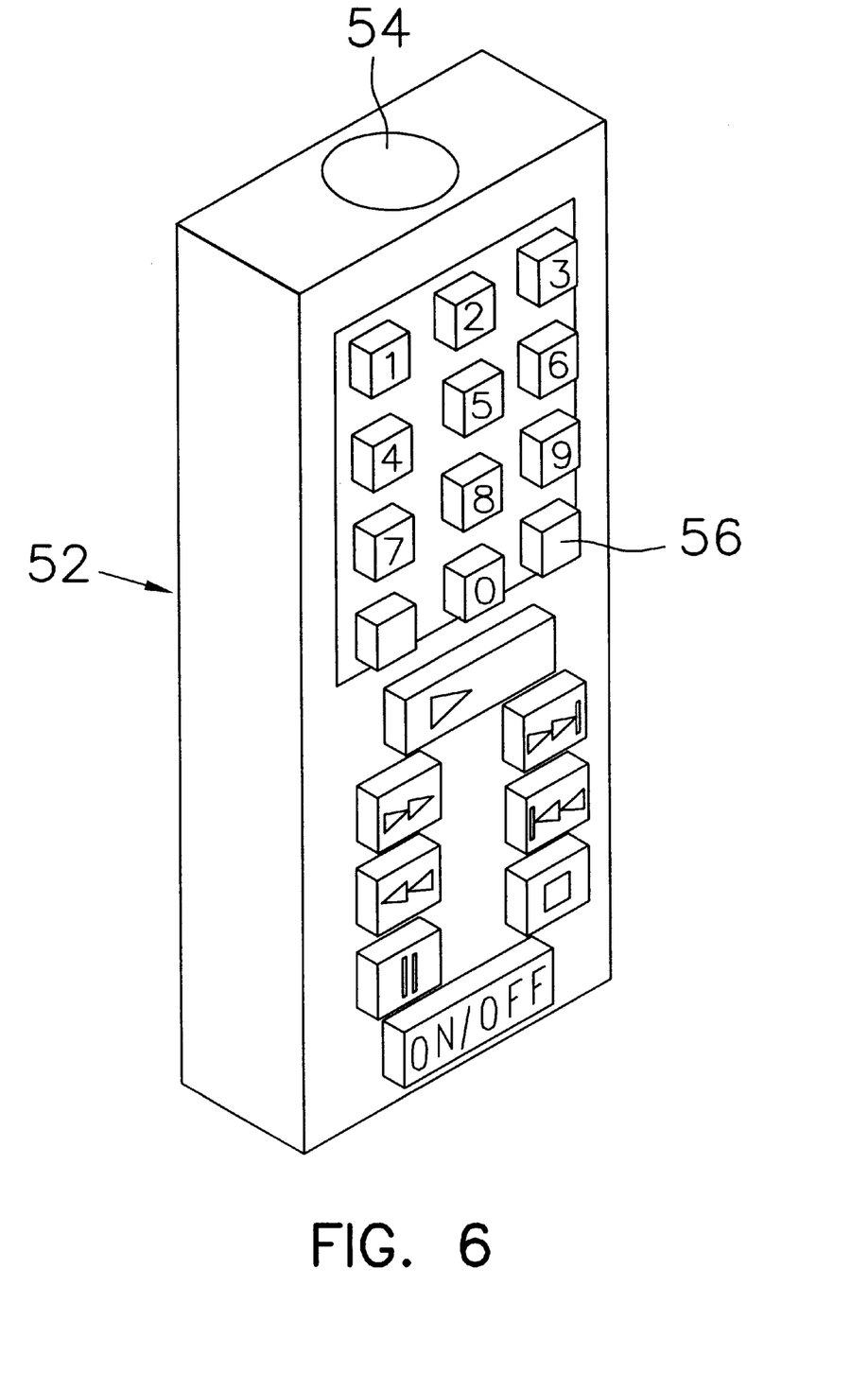

As has been shown and described hereto, the audio controls for a CD-ROM player in conjunction with the present invention are supported by the housing of the player. However, the present invention is not so limited. The audio controls may be remote as well. This is shown in FIG. 6, which is a perspective view of a remote control for a CD-ROM player in accordance with an embodiment of the present invention. Remote control 52 has transmitter 54 and audio controls 56. Audio controls 56 correspond to audio controls 22 of FIG. 2. Reference should be made to the discussion in conjunction with controls 22 of FIG. 2, for further understanding thereto.

Transmitter 54 permits wireless communication with a CD-ROM player, which has a corresponding receiver to receive the signals transmitted by transmitter 54. That is, transmitter 54 sends wireless signals to the CD-ROM player to inform the player which of controls 56 has been activated by the user of the player. The present invention is not limited to any particular manner or mode of wireless communications. In one embodiment, transmitter 54 communicates with the corresponding receiver of the player via infrared signals, while in another embodiment, transmitter 54 communicates with the receiver via radio-frequency signals, both of which are well known to those of ordinary skill within the art. Any other mode or manner is also within the scope or spirit of the invention.

Those of ordinary skill within the art will readily appreciate that many changes and modifications to the above drawings and description can be made without departure from the spirit or scope of the following claims. For example, the invention as shown in several of the drawings has been shown to apply to a laptop computer. However, modification of the present invention to apply to a desktop computer is also within the scope of the following claims. For further example, the invention has been described hereto to apply to a compact-disc read-only-memory (CD-ROM) player having a CD-ROM mechanism. However, the invention is not so limited, and any optical disc player having any optical disc mechanism pursuant to the invention is within the scope of the following claims.

I claim:

1. An optical disc player for a computer having a front surface, comprising:

a housing having a top surface and a front surface removably insertable into the computer such that the front surface of the housing is substantially flush with the front surface of the computer when the optical disc player is inserted into the computer;

a mechanism, having a stand-alone mode and an internal mode, disposed within the housing, wherein the internal mode is for accessing data on an optical disc for utilization in conjunction with the computer and the stand-alone mode is for playing content on the optical disc for utilization apart from the computer;

a power source component disposed within the housing to provide power to the mechanism in the stand-alone mode and, at least one control disposed within the top surface of the housing such that the at least one control are unaccessible when the optical disc player is inserted into the computer, each control operatively coupled to corresponding functions.

2. The player of claim 1, further comprising an audio connector operatively coupled to the optical disc mechanism to operatively couple an audio device to the player.

3. The player of claim 1, further comprising a power amplifier to amplify the audio signals provided from the audio compact disc in the stand-alone mode.

4. The player of claim 1, wherein the power source component comprises a removable-battery compartment.

5. The player of claim 1, wherein the power source component comprises a connector for coupling to an alternating-current (AC) adaptor.

6. A computer comprising:

a housing having a front surface and a slot within the front surface and encasing at least a processor, random-access memory (RAM), and read-only memory (ROM); and, an optical disc player removably insertable into the slot of the housing and operable in a stand-alone mode for playing an optical disc when the player is removed from the computer, a optical disc player having at least one control, the at least one control unaccessible when the optical disc player is inserted into the slot of the housing and accessible when the optical disc player is removed from the slot of the housing, the optical disc player also having a front surface such that the front surface of the optical disc player is substantially flush with the front surface of the housing when the optical disc player is inserted into the slot of the housing.

7. A computerized system comprising:

a computer having at least a processor, a random-access memory (RAM), and a read-only memory (ROM), the computer having a housing having a front surface and a slot within the front surface; and, an optical disc player removably insertable into the slot of the housing of the computer and operable in a stand-alone mode for playing an optical disc when the player is removed from the computer, the optical disc player having at least one control, the at least one control unaccessible when the optical disc player is inserted into the slot of the housing of the computer and accessible when the optical disc player is removed from the slot of the housing of the computer, the optical disc player also having a front surface such that the front surface of the optical disc player is substantially flush with the front surface of the housing of the computer when the optical disc player is inserted into the slot of the housing.

8. The computerized system of claim 7, further comprising a remote control wirelessly communicatively coupled to the player to control at least one audio function of the player.

9. The computerized system of claim 8, wherein the remote control communicates with the player via infrared signals.

10. The computerized system of claim 8, wherein the remote control communicates with the player via radio-frequency signals.

* * * * *

UNITED STATES PATENT AND TRADEMARK OFFICE
CERTIFICATE OF CORRECTION

PATENT NO. : 5,910,933

DATED : Jun. 8, 1999

INVENTOR(S) : Robert Moore

It is certified that error appears in the above-identified patent and that said Letters Patent is hereby corrected as shown below:

At Col. 8, line 51, please delete "a" following "computer," and insert --the--.

Signed and Sealed this

Twenty-first Day of December, 1999

Attest:

Q. TODD DICKINSON

*Attesting Officer*  *Acting Commissioner of Patents and Trademarks*